United States Patent [19] [11] Patent Number: 5,054,345
Weber [45] Date of Patent: Oct. 8, 1991

[54] METHOD OF OBTAINING CONSTANT WEIGHT PORTIONS OR SLICES OF SLICED FOOD PRODUCTS

[76] Inventor: Guenther Weber, Oberer Birkenweg 17b, Biedenkopf-Wallau, Fed. Rep. of Germany, 3560

[21] Appl. No.: 595,624

[22] Filed: Oct. 5, 1990

Related U.S. Application Data

[63] Continuation of Ser. No. 324,359, Mar. 15, 1989, abandoned.

[30] Foreign Application Priority Data

Mar. 16, 1988 [DE] Fed. Rep. of Germany ....... 3808790

[51] Int. Cl.$^5$ .............................................. B26D 5/20
[52] U.S. Cl. .......................................... 83/42; 83/75; 83/77; 83/365; 83/367; 53/435
[58] Field of Search ................ 83/13, 73, 75, 77, 167, 83/358, 363, 365, 367, 932; 53/544, 543, 542, 435; 177/50, DIG. 6

[56] References Cited

U.S. PATENT DOCUMENTS

| 3,846,958 | 11/1974 | Divan | 83/367 X |
| 3,906,823 | 9/1975 | Spooner | 83/73 |
| 4,136,504 | 1/1979 | Wyslotsky | 83/77 X |
| 4,548,107 | 10/1985 | Marchese et al. | 83/73 X |
| 4,572,044 | 2/1986 | Antonissen | 83/367 X |
| 4,875,254 | 10/1989 | Rudy et al. | 83/365 X |
| 4,941,375 | 7/1990 | Kasper | 83/23 |

Primary Examiner—Frank T. Yost
Assistant Examiner—Rinaldi Rada
Attorney, Agent, or Firm—Townsend and Townsend

[57] ABSTRACT

A method is described for obtaining constant weight portions or slices from sliced food products wherein in each case individual slices or portions of several slices with exactly predeterminable weight can be formed in real time operation during the cutting process by detecting the cut surface area, taking account of the specific weight and computing the required feed of the product.

7 Claims, 1 Drawing Sheet

METHOD OF OBTAINING CONSTANT WEIGHT PORTIONS OR SLICES OF SLICED FOOD PRODUCTS

This is a continuation of application Ser. No. 07/324,359, filed Mar. 15, 1989, now abandoned.

BACKGROUND OF THE INVENTION

The invention relates to a method of obtaining constant weight portions or slices of sliced food products, in particular food products with peripheral contours which vary over their lengths, wherein a number of slices are cut-off from the product piece to be sliced in dependence on the desired weight and the feed of the particular product piece to be sliced is changed in dependence on deviations from the desired weight.

In many known methods it is customary to first detect the weight of or weigh portions or stacks of slices when weight correction of the relevant stack is no longer possible, at least automatically. Apart from the fact that in these cases it is always necessary to operate with a safety addition in order to avoid underweight portions, which are impermissible, with the safety addition having definitely negative effects from an economical viewpoint it is also unfavourable that after finding weight deviations which are too large, the correction which is necessary, can always only be made with a considerable delay. This in turn leads either to a corresponding loss of the product to be cut up, or requires personnel intensive sorting of underweight portions or slices.

SUMMARY OF THE INVENTION

The object underlying the present invention is to provide a method of the initially named kind which makes it possible to achieve the desired weight of the respective portion or slice practically exactly, and indeed without impairing the working speed when forming portions or slices.

This object is satisfied in accordance with the invention essentially in that the size of the exposed cut surface is determined at least periodically during the cutting process, and the feed necessary to achieve the desired weight is calculated between sequential cuts using a computer from the size of the cut surface and also the specific gravity of the particular product to be cut up and is used as a control parameter.

By determining the respectively exposed cut surface it is possible, practically in connection with each cutting process, to precisely calculate the product feed which leads to a specific predeterminable weight of the particular slice that is cut. Thus a real time cut thickness control is contained which in particular ensures slices of defined weight independently of the cross-sectional shape of the product to be cut up. Within a portion of a defined weight it is possible in this manner either to preset the number of slices in a defined manner or to select the slice thickness in defined manner, and indeed even when the cross-sectional shape of the product to be cut up varies greatly.

The determination of the respective area of the exposed cut surface preferably takes place via a wave reflection, with use being made of the fact that the reflection behaviour of the exposed cut surface is substantially distinguished from the reflection behaviour of the product located behind the plane of the cut and also of the above environment.

Particularly advantageous embodiments for carrying out the determination of the exposed cut surface are set forth in the subordinate claims. In many products the specific gravity is constant over the total volumes, so that a correction is not necessary during the cutting process. If however a product consists of different components with significantly different specific gravity, for example meat and fat regions in a ham then the respective proportions of the different components at the exposed cut surface are preferably determined, again in particular by their differing reflection behaviour, and a corresponding real time correction is effected during the weight determination.

The method of the invention which makes use of the extremely short signal processing times available with modern data and computer technology not only brings a maximisation of the yield, and thus a decisive improvement of the economy of the cutting process, but rather also makes a substantial reduction in the number of personnel possible, since many of the previously required control, checking and correction activities are almost completely avoided.

BRIEF DESCRIPTION OF THE DRAWING

The invention will now be described in more detail with reference to the accompanying drawing.

DETAILED DESCRIPTION OF THE INVENTION

Figure 1:
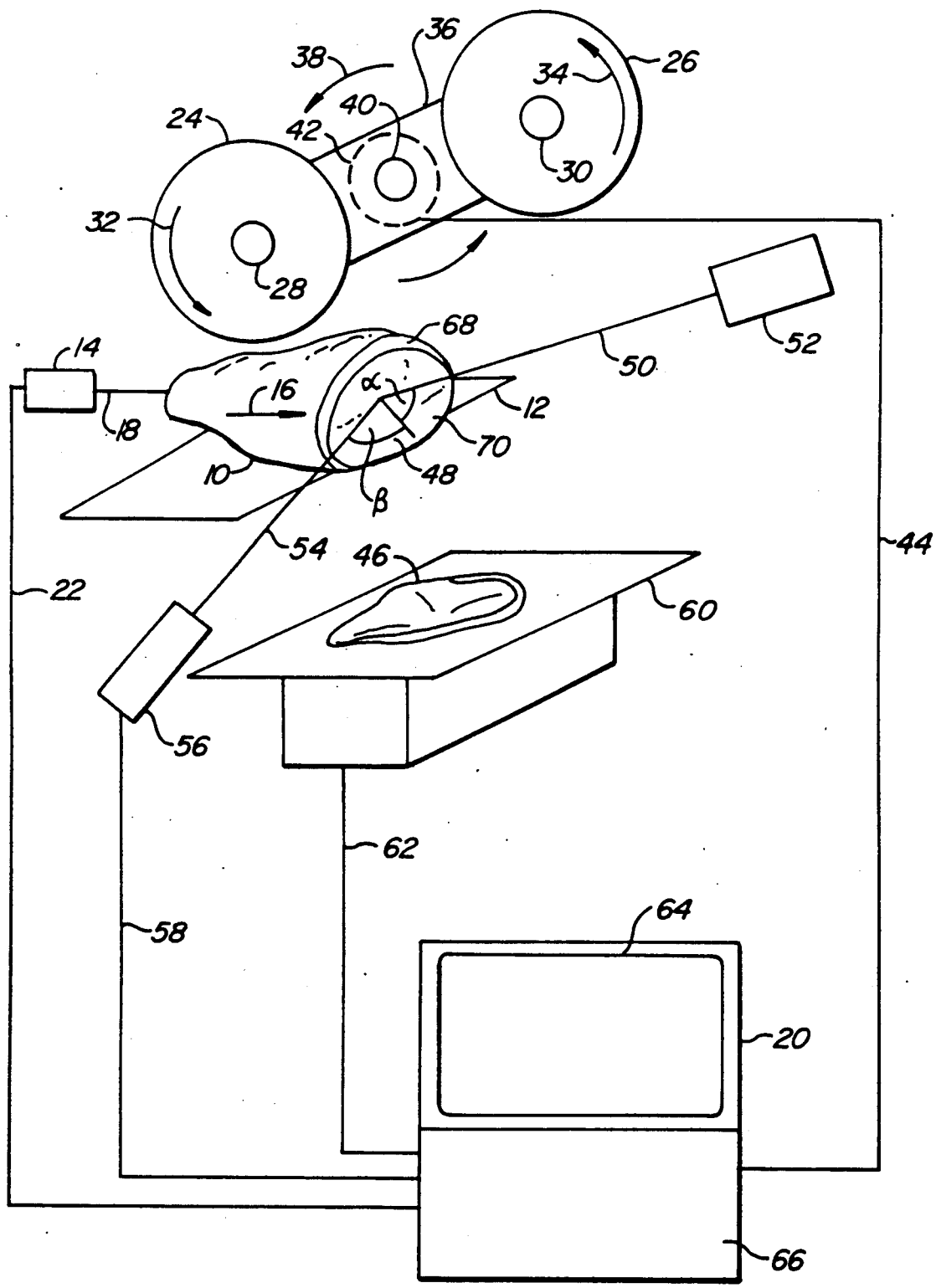
FIG. 1 is a perspective illustration of a cooked ham being sliced by an automatic slicer controlled in accordance with the invention.

As shown in the drawing a cooked ham 10 having an irregular but generally conical shape is supported on a table 12 of an automatic slicer. A feed motor 14 is provided which is able to advance the ham 10 relative to the table 12 in the direction of the arrow 16 via a feed mechanism illustrated for the purpose of illustration by the line 18. The feed motor 14 receives signals from a computer 20 via a line 22 and these signals determine the amount of feed to be made by the ham 10 in the direction 16 between each slice and the next successive slice. Slicing is effected by means of an automatic slicer having, in this example, two disk-like cutting knives 24 and 26 which each rotate about their own axes 28 and 30 in the direction of the arrows 32 and 34 respectively. The two disk-like knives are also mounted on a knife carrier 36 which rotates in the direction of the arrow 38 on an axle 40. The axle 40 is driven by a motor 42 which is only schematically illustrated in broken lines in the drawing. The motor 42 is connected to the computer via a line 44. This line 44 can transmit the drive power to the motor or can also, as in the present case, simply transmit an electrical signal from which the computer can deduce the instantaneous angular position of the rotating knife arrangement.

The exposed cut surface 48 of the ham 10 is irradiated with a light beam 50 from a light source 52 at an angle $\alpha$ and the light 54 remitted or diffusely reflected from the surface 48 falls as a light beam 54 onto a video recorder 56 arranged at the angular specular reflection $\beta$ which is numerically called to the angle $\alpha$. The video camera 56 is connected via a line 58 to the computer 20 and is focussed onto the exposed cut surface, i.e. onto the plane of cutting.

Slices such as 46 cut from the metal fall onto a weighing scale 60 which is connected to the computer 20 via a line 62. The computer 20 has a screen 64 which shows the parameters selected by the operator, for example the type of food product being cut, the desired selected weight per portion, the desired number of slices per portion, the minimum permissible area per slice and optionally the specific gravity of the product. These parameters can be fed into the computer 20 by the operator using the keyboard 66.

In operation the exposed surface 48 of the ham 10 is illuminated over its entire area by the light beam 50 and the video camera scans the exposed surface 48 linewise. The signals generated by the camera 56 are passed via the line 58 to the computer 20 which computes from these signals the length of each scanned line on the exposed surface 48 of the ham and from the total of these lengths a value corresponding to the exposed surface area of the last cut, i.e. the area of the surface 48.

Various procedures are possible to distinguish between light received from background sources and light received from the edge of the ham. By way of example the background will typically have a different reflective characteristic from the surface of the ham and therefore the surface of the ham can be readily distinguished by carrying out a simple threshold amplitude evaluation of the video signals in the computer 20.

Alternatively, the video camera can be provided with an objective having a very sharp focus which is accurately located at the surface of the meat 48. In this way the computer 20 evaluates only signals which it has previously classified as arising from a sharply focussed object and ignores signals arising from portions surrounding the ham which are out of focus. The signals obtained via the line 44 enable the computer 20 to gate the video signal received from the camera 58 so that signal evaluation is only carried out in the time intervals between successive cuts of the ham 10 via the disk-like cutting knives 24 and 26. This avoids possible falsification of the measurement result by the presence of the knives in the field of view of the video camera.

Having established the exposed cut area from the signals received from the video camera 58 the computer can calculate, from the area and the specific gravity of the product, the required feed from the feed motor 14 in order to obtain a desired weight per slice. This calculation can be effected either on the basis of a specific gravity value stored in a look-up table in the computer 20, or on the basis of a value fed into the computer 20 by the operator at the keyboard 66. The result of the cut can then be checked via the line 62 which supplies the weight of the slice to the computer 20. When more than one slice is present on the weighing scale 60 the computer subtracts the penultimate weight from the last received weight to obtain the weight of the last cut slice. Should the computer discover, as a result of the signal received from the line 62, that the weight of the slice 46 differs from the calculated weight from the preset specific gravity it can correct the stored value of the specific gravity for subsequent slices. Indeed this check can be repeated at different intervals during the cutting of the product 10, so as to take account of changing specific gravity arising from whatever source, for example changing ratio of fat 68 to lean meat 70.

For each slice the computer 20 calculates the feed of the motor required to produce a slice of the desired weight and controls the feed motor accordingly via the line 22.

Once the exposed area of the cut has reached the minimum value preset in the computer 20 the computer terminates the cutting operation.

Various modifications are possible. By way of example it is possible for the computer 20 to calculate the respective proportions of fat 68 and lean meat 70 from the different amplitudes of the pixel signals from the video camera 56, and to use different specific gravity values for the fat and lean meat portions so as to obtain a more accurate control of slice weights. Again these different specific gravity can be preset in the computer or can be calculated by the computer from comparison of the weights of different slices with different proportions of fat and lean meat. The latter method will generally be more accurate since it takes account of the actual piece of meat being cut rather than being based on average values. There is of course no restriction to only two different components of the food product, some sausage meats may for example contain several different distinct ingredients which can be separately evaluated with respect to their component areas.

Although, as previously described, the system aims at producing slices having a constant weight per slice, it may be desirable in some circumstances to have slices of uniform thickness and simply to control the thickness of the last one or two slices to achieve the desired weight per portion. In this case the computer continuously checks the weight of the already cut slices supplied to it via the line 62 and on approaching the final desired end weight makes an adjustment to the feed value to obtain precisely the desired end weight of the portion of food product.

What is claimed is:

1. A method of obtaining constant weight portions of a food product having an already cut, exposed surface by slicing the food product with a cutting device, the food product having a peripheral contour which varies over its length, each portion including a plurality of slices, the method comprising the steps of:
    a) selecting a desired weight for the portion of the food product;
    b) determining the surface area of the cut, exposed surface prior to cutting a slice;
    c) identifying different food components and the respective food component occupies by them in the cut, exposed surfaces;
    d) calculating a specific gravity of the product in the vicinity of the food product contiguous with the cut, exposed surface using data relating to a previously determined surface area, the food component areas and specific gravities of the food components;
    e) advancing said product relative to said cutting device by an amount to obtain a first slice having one of a desired weight and a desired thickness;
    f) cutting the first slice;
    g) repeating the steps b) to f) to obtain further slices; and
    h) adjusting the amount by which the food product is advanced relative to said cutting device for at least one of the slices so that a cumulative weight of said slices equals the desired weight of the portion.

2. A method according to claim 1 wherein the steps of identifying and determining include the steps of sensing light reflected from the cut, exposed surface with a video camera.

3. A method according to claim 1 wherein the step of calculating comprises the step of calculating the specific weight and the required thickness of the slice with the computer.

4. A method according to claim 1 including the step of establishing the weight of the previously cut slice, with a computer calculating the specific gravity of the previously cut slice, obtaining the specific gravity of the food product, with the computer determining any difference in the specific gravities of the previously cut slice and the food product, with the computer correcting the specific gravity of the food product by said difference to provide an adjusted specific gravity for the food product, and thereafter using the adjusted specific gravity for subsequent steps of the method until the computer determines that there is a difference between the calculated specific gravity of a cut slice and the adjusted specific gravity.

5. The method according to claim 1 wherein the different food components of the exposed cut surface are meat and fat regions.

6. The method according to claim 5 wherein the food product is ham.

7. A method for obtaining slices of constant weight from a food product having a previously cut, exposed surface and different product components distributed throughout the product, the components having significantly different specific gravities, which comprises:

(a) selecting a desired weight for the slice of the food product;

(b) irradiating the cut, exposed surface of the food product with a light source;

(c) detecting light reflected by the cut, exposed surface;

(d) from the detected light determining the area of the cut, exposed surface and the area of the product components visible in the cut, exposed surface;

(e) from the determined area of the cut, exposed surface and the determined area of the product components visible in the cut, exposed surface establishing the specific gravity of the product in the vicinity of the food product contiguous with the exposed area and therewith calculating the required thickness of the slice to provide it with said constant weight;

(f) thereafter cutting the slice with the required thickness from the food product;

(g) repeating steps b) to f) to obtain further slices; and (h) adjusting the thickness of the slice during a repeated cutting step in response to a detected difference between the specific gravities established for a previously cut slice and the slice about to be cut so that the weight of the cut slices remains substantially constant.

* * * * *